United States Patent Office 3,057,843
Patented Oct. 9, 1962

3,057,843
POLYMERIZATION OF UNSATURATED HYDROCARBONS
Kelly Farhat, Clinton, and Frederick J. Webb, Cuyahoga Falls, Ohio, assignors to The Firestone Tire & Rubber Company, Akron, Ohio, a corporation of Ohio
No Drawing. Filed Nov. 3, 1958, Ser. No. 771,217
3 Claims. (Cl. 260—94.9)

This invention relates to the polymerization of mono-olefins, and particularly of ethylene, to form high polymers.

It has been discovered, in an investigation in which the present applicants have been associated, that olefins may be polymerized to high molecular weight products by contact with composite catalysts produced by mixing (A) adducts of (1) alkali and alkaline-earth metals with (2) aromatic polynuclear hydrocarbons produced by simple contact of the metals with the hydrocarbons, of the general class described by Paul et al. J.A.C.S. 78, 116 (1956) with (B) compounds of heavy metals, boron, silicon or arsenic. These catalysts, while they bear a superficial resemblance to the so-called "Ziegler" catalysts, are to be distinguished therefrom in that the hydrocarbon portion of the reducing metal compound is apparently a negative free radical, rather than being covalently bonded to the metal as in the typical Ziegler catalysts. This difference shows up in the polymeric products, which are free from the vinyl or internal unsaturation characteristics of Ziegler polymers.

Anthracene, on the basis of its cost and availability, is a prospectively attractive aromatic hydrocarbon for use in the adduct-type catalyst referred to above. However with previous processes of this type using anthracene, the yields, based on the amount of catalyst used, tend to be low, and the polymer is obtained in the form of discolored, raisin-like aggregates, which it is impossible to purify adequately.

Accordingly, it is an object of this invention to provide an improved polymerization process using novel adduct-type catalysts of the type described above, and using anthracene as the aromatic hydrocarbon therein, not having the disadvantages of earlier processes using anthracene as the aromatic hydrocarbon.

Another object is to provide such a process in which the polymer is obtained in the form of a fine, freely flowing powder, readily worked up to a pure, colorless, white product.

*Synopsis of the Invention*

The above and other objects are secured, in accordance with this invention, in a process in which an alpha-methylene-group-containing mono-unsaturated olefin is polymerized in the presence of a catalyst composed of (A) a highly electropositive metal (e.g., an alkali or alkaline-earth metal) adduct of anthracene plus (B) a compound of a heavy metal, or of boron, silicon or arsenic, in which the adduct (A) is exhaustively abraded or ground, preferably before addition of the heavy metal compound, and in which the ratio of the number of gram-equivalents of the alkali or alkaline-earth metal in the adduct (A) to the number of moles of the heavy metal in the heavy metal compound is from about 6 to about 24. The yield (based on the weight of catalyst used) of polymers produced in this manner are greatly enhanced in comparison to the generality of processes of this sort. Of equal, and in some respects greater, importance, the polymers are obtained in the form of readily flowable powders, which can be worked up by convenient methods to yield colorless white products.

*The Mono-Olefins Employed*

Mono-olefins suitable for polymerization in accordance with this invention include all mono-olefins in which the unsaturated group is an alpha-methylene group having the structure $H_2C=C<$. In general it is preferred to use olefins containing not over 8 carbons, ethylene being the preferred monomer for use in the invention. Other suitable mono-olefins include for instance propylene, butene-1, isobutylene, pentene-1, hexene-1, octene-1, 2-methyl pentene-1, 3-methyl pentene-1, 3-ethyl pentene-1, and the like. The polymers produced from these monomers in accordance with this invention are of regular and unbranched structure, as reflected by high melting points, mechanical strength and crystallinity. The polymers are likewise characterized by absence of unsaturation, either in the form of vinyl groups or in the form of double bonds internal to the chain, i.e., in the form $—CH=CH—$.

*The Electropositive Metal Adducts of Anthracene*

A relatively unfamiliar mode of reaction is displayed by the reaction of strongly electropositive metals, such as the alkali and alkaline earth metals, with anthracene. The reaction results in the formation of salt-like addition compounds without replacing hydrogen in the hydrocarbon, see Paul et al. supra. These compounds show relatively high conductivity in solution, and in the solid isolated state, they are semiconductors. They are also characterized by a peculiar reaction with mercury, whereby the metal is removed and becomes amalgamated with the mercury, and the anthracene is regenerated as such. These properties and reactions are in contrast with the usual covalent metal-substituted anthracenes, made for instance by reaction of an anthracene halide with the free metal, with elimination of metal halide; these more common compounds contain the metal occupying the place of a hydrogen atom in the anthracene; these usual metal-substituted anthracenes show relatively low conductivity in solution and no semi-conductivity in the solid state; and they react with mercury (excepting, of course when the compound is already a mercurated napthalene) to exchange the metal for the mercury, without regeneration of the hydrocarbon. Reverting to the adducts used in this invention, these are commonly prepared by simply agitating the aromatic hydrocarbon and finely-divided electropositive metal together in a suitable solvent at ordinary room temperature (say 15–30° C.) for a period of time sufficient to carry the reaction to the desired extent. Adducts prepared in this simple way are not, however, directly usable in the practice of this invention; they must be subjected to prolonged intensive grinding, or otherwise the excellent results of this invention are not achieved. It is surmised, without absolute commitment to this theory, that the grinding develops super-stressed and defect-crystal domains in the adducts, which react with the heavy metal compound to provide especially favorable catalytic sites. Suitable electropositive metals are exemplified in the alkali metals such as lithium, sodium, potassium, cesium and rubidium, and alkaline earth metals such as magnesium, calcium, strontium and barium. With reference to the amounts of electropositive metals to be used, earlier work of Paul et al. supra postulated that the anthracene ion may be either mono- or divalent, the two forms being in equilibrium. Those experiments, however, were conducted in solution in polar solvents. The adducts when used in the present invention, are in the solid phase and in contact with non-polar solvents, and under these conditions it appears that only the compounds of the divalent anthracene ion are stable. Accordingly, the electropositive metal, if mono-electrovalent (e.g., an alkali metal), should be supplied in the proportion of two gram-atoms per mol of anthracene, and if divalent (e.g., an alkaline earth metal) it should be supplied in the proportion of one gram-atom per mol of anthracene. Deviation in either direction is not particularly harmful, but is wasteful, since only the materials equivalent to the divalent naphthalene ion compound will be of any avail in the process.

As noted above, the adducts may be prepared in the presence of ethers or other polar solvents not containing active hydrogen. In such cases, the ethers or other undesired polar solvents must be removed at some stage before the use of the adduct in the polymerization reaction, as they would interfere with the polymerization. The removal may be accomplished by distillation with a hydrocarbon solvent (such as hereinafter described as suitable for the polymerization) to displace the undesired solvent. It is by far preferable, however, to carry out the original reaction between the metal and the anthracene in a hydrocarbon solvent which will be ultimately acceptable as a constituent of the polymerization medium; and it has been discovered that, if the reaction mass is subjected to a grinding action, the formation of the adduct will proceed in the presence of the hydrocarbon solvent, even in the absence of any polar solvent. This grinding also serves to develop the properties of the adduct which fit it for use in this invention.

With respect to the grinding operation used in the synthesis of the adducts and/or in the inducement of the physico-chemical properties of the adducts which fit them for the practice of this invention, there may be employed any mode of grinding action in which the granules of the adducts (or, if grinding is carried on during the synthesis of the adducts, the bodies of the electropositive metal and of anthracene) are subjected to a simultaneous grinding and crushing action against surfaces which are, in relation to the particles of the adducts and/or naphthalene and metal, relatively hard and massive. It will be understood that if the original synthesis of the adducts is carried out with application of grinding, the metal constituent, which is the more refractory, should be supplied in relatively finely divided form, e.g., in the form of granules ranging in diameter from 0.001 to 1 mm. Particularly suitable for this purpose are rod, ball and pebble mills. Likewise suitable are devices such as the "Attritor" in which the reactants, together with a mass of balls, pebbles or the like, are stirred by means of agitator arms. Other types of mills are disc mills, hammer mills, roller paint mills, kollergangs and the like, wherein the ingredients are passed between relatively moving surfaces at close clearances. Likewise, there may be employed impact mills, in which the ingredients are projected under pressure as a high-velocity jet against a hard target. In general, any equipment may be used which will forcibly thrust the granular materials against a hard surface with local stresses in excess of the strength of the materials. The grinding surfaces i.e., ball- and rod-mill liners, tumbling elements, disc mill discs, paint mill rollers, etc., of the apparatus may be of any substance which is non-reactive with the reactants at the temperatures at which the process is conducted, and which is sufficiently hard (say 3.0 or more on Mohs' scale) to crush the granular reactants without damage to itself. Exemplary materials for such grinding surfaces are natural stony materials such as granite, marble, quartz and the like; ceramic matrials such as glass, fused quartz and porcelain; and various hard, non-corrosive metals such as stainless steel, Monel metal, nickel and the like. As to the duration of the grinding operation, this can be carried on for an indefinitely long time without detriment to the properties of the adduct, although it will be appreciated that after a certain point further grinding produces only minimal improvement in the behavior of the adduct. It is recommended that the grinding be of such duration and intensity that the total power consumed by the grinding operation should be from 3 to 100 watt-hours per gram of material operated upon. The temperature during the grinding should be kept low, preferably below 100° C. to avoid decomposition of the adduct. It will be appreciated that there would be no theoretical minimum temperature, although there is no point in carrying the temperature much below ordinary ambient temperatures of 0°–35° C.

The Heavy Metal Compounds

The heavy metal compounds forming the other component of the complex catalysts of this invention are compounds of boron, silicon or arsenic or of all those elements enclosed by the bracket entitled "Heavy Metals" and by the heavy black lines terminating at said bracket (including the lanthanides) in the periodic chart given in Lange's "Handbook of Chemistry," fifth edition, Handbook Publishers, Inc., 1944, pages 54 and 55. In general, these compounds will be salts and oxides of the cited elements, suitable salts being the chlorides, bromides, iodides, acetylacetonates, alkoxides and the like. Specific suitable compounds for complexing with the electropositive metal-aromatic hydrocarbon adducts include for instance titanium tetrachloride, zirconium tetrachloride, zirconium acetylacetonate, tetrabutyl titanate, ferric chloride, ferrous chloride, antimony pentachloride, bismuth trichloride, titanium trichloride, stannic chloride, antimony pentoxide, sodium bismuthate, sodium chromate, chromium chloride, cupric chloride and the like. The complexes are formed by mixing and agitating the electropositive metal-anthracene adduct and heavy metal compound together, preferably in suspension in a saturated aliphatic or aromatic hydrocarbon solvent such as petroleum ether, heptane, benzene, toluene or the like, at any convenient temperature, say 25° C., although lower temperatures down to −100° C. or higher temperatures up to 70° C. or 80° C. may be used. As to the relative proportions of these ingredients, the ratio of the number of gram-equivalents of the alkali or alkaline earth metal in the adduct to the number of moles of the heavy metal compound should be from about 6 to about 24, all equivalents being calculated on the basis of the valencies of the metals as they exist in the adduct. For instance, a gram-equivalent of the sodium adduct of anthracene, which contains two sodium atoms, each of which is monovalent, will be (224 i.e., the molecular weight of $C_{14}H_{10}Na_2$) ÷ 2
= 112 grams Stated on another basis, since the anthracene ion in the adducts is doubly charged, each gram-equivalent of the alkali or alkaline earth metal corresponds to one-half mole of the complete adduct; and therefore, for each mole of heavy metal compound used, the minimum number of moles of adduct to be used is one-half of 6, or 3, and the maximum number of moles of adduct is one-half of 24, or 12. Departure from the prescribed range for the ratio of the components, as will also omission of the grinding of the adduct, results in poor yields of products, which products moreover will be in the form of agglomerates extremely difficult to purify.

The Polymerization

The polymerization is carried out by contacting the catalyst with the unsaturated hydrocarbon, preferably with stirring or agitation to insure access of the hydrocarbon to the catalyst. Preferably there is present an inert aliphatic or aromatic hydrocarbon liquid solvent such as a parrafin of molecular weight from 58 to 600, e.g., petroleum ether, pentane, heptane, kerosene, diesel oil or the like, benzene, toluene and the various xylenes, as the solvent serves to suspend the catalyst and to provide heat transfer. It is recommended that a weight of solvent at least equal to the expected yield of polymer be employed. The catalysts of this invention are operative at atmospheric pressure, but a much more rapid reaction and better yields are obtained when the olefin is supplied under partial pressures of from 300 to 700 p.s.i.

With the foregoing general discussion in mind, there are given herewith detailed examples of the practice of this invention.

EXAMPLE I

A. Preparation of Adduct:

| | |
|---|---|
| Anthracene (M.P. 213–214° C.) | 17.8 g. (0.1 mol). |
| Sodium paste (35% dispersion in petrolatum) | 13.1 g. (0.2 g.-atom of sodium). |
| Xylene (refluxed and distilled over sodium sand, stored over calcium hydride) | 150 ml. |

A 28-ounce-beverage bottle containing 25 one-half inch diameter steel balls was used in this preparation. The bottle, containing the balls, was oven-dried at 100° C. for 1 hour. The bottle was removed from the oven and the anthracene immediately added thereto. The bottle was cooled to 25° C. while passing a stream of argon therethrough and the sodium paste slurried up in the xylene and poured into the bottle, which was then flushed with argon and sealed with an aluminum-foil-lined crown cap. The bottle, encased in a fiber drum, was put upon a roller-cradle which revolved the bottle horizontally upon its long axis at the rate of 60 r.p.m. Rolling was continued for a total of 112 hours, at the end of which time the bottle was withdrawn for use in the polymerizations described below. For storage and use, the foil-lined crown cap was replaced with an elastomer-lined cap provided with an aperture for hypodermic withdrawal of the contents.

B. Polymerization:

| | |
|---|---|
| n-Heptane | 350 ml. |
| Suspension of sodium-anthracene adduct (prepared as just described) | 15 ml. (0.01 mole of adduct). |
| Titanium tetrachloride | .38 mil. (0.0033 mole). |

For this run there was provided a rocking pressure bomb having a cylindrical chamber containing a stainless steel liner having inside dimensions of 14" length by 3" diameter, and a flexible spiral tube for introducing gases into the chamber from a stationary source. The rocking mechanism was arranged to oscillate the cylindrical chamber about a horizontal axis perpendicular to the axis of the chamber with an amplitude of 30° from the horizontal in each direction and a frequency of 36 complete cycles per minute. The liner was removed from the bomb, dried in an oven at 100° C. and cooled to room temperature while passing a current of argon therethrough. The heptane, titanium tetrachloride and suspension of adduct were charged into the liner in that order, the liner was reinserted and sealed into the bomb chamber, and the free space purged twice by pressuring the chamber to 500 p.s.i. with nitrogen, and venting. The chamber was then pressured to 500 pounds with ethylene, and rocking commenced. Following is a schedule of the temperature and pressure in the bomb.

TABLE I

| Time since start (min.) | Temp. (° F.) | Pressure (p.s.i.) |
|---|---|---|
| 0 | 90 | 500 |
| 10 | 115 | 500 |
| 35 | 205 | 450 |
| 115 | 150 | [1] 225 |
| 215 | 125 | [1] 350 |
| 335 | 115 | [1] 400 |
| 1,250 | ------ | 275 |

[1] Repressured to 500.

At the end of the run, the bomb was vented and opened, and the charge, together with 500 ml. of ethanol, transferred to a Waring Blendor, in which the material was broken up into a slurry. The liquid phase was removed by filtration and the cake broken up and heated and stirred under reflux for one hour with a solution of 500 ml. of water, 500 ml. of ethanol and 100 ml. of concentrated hydrochloric acid. The slurry was filtered, and the cake stirred and heated under reflux for one hour with a mixture of 500 ml. ethanol, 500 ml. of water and 5 ml. of concentrated ammonia. The slurry was again filtered, and the cake broken up and dried in an oven for 30 hours. The resultant polyethylene product, amounting to 140 grams (51.1 grams per gram of catalyst) was a white, freely-flowing powder, and when molded into test specimens, had the following properties: density .949 g./ml.; ash 0.204%; tensile strength 5233 p.s.i.; elongation at break 303%; modulus of elasticity at 300% elongation, 5192 p.s.i.; Izod notched impact strength 23.6 ft.-lb./in. notch at 25° C., 30.0 ft.-lb./in. notch at −40° C.; bending modulus 148.500 p.s.i.; Rockwell hardness 43 on the R scale. Likewise the plasticity of the resin at various temperatures was measured by the following procedure. A one-half gram conical pile of the resin powder was placed between cellophane sheets and placed between the heated platens of a flat-platen laboratory press. The platens were quickly closed on the resin pile and left in contact therewith for ten seconds without application of any substantial pressure. A total load of 1500 pounds was then applied to the platens for 30 seconds, the press quickly opened, and the resultant plaque removed. The area of the plaque, in square millimeters, is taken as a measure of the plasticity of the resin at the test temperature. Measured by this method, the plasticity of the resin of this invention was 1190 sq. mm. at 190° C., and 1420 sq. mm. at 250° C.

EXAMPLE II

| | |
|---|---|
| Hexane | 350 ml. |
| Suspension of sodium-anthracene adduct (prepared as described in Example I-A) | 15 ml. (0.01 mole of adduct). |
| Titanium tetrachloride | 0.38 ml. (0.0033 mole). |

The procedure of Example I was repeated with the above ingredients, in which n-hexane is substituted for n-heptane. Following is the schedule of conditions during the polymerization.

TABLE II

| Time (min.) | Temp. (° F.) | Pressure (p.s.i.) |
|---|---|---|
| 0 | 9 | 500 |
| 15 | 120 | 500 |
| 45 | 220 | 475 |
| 60 | 205 | [1] 375 |
| 135 | 145 | [1] 300 |
| 315 | 120 | [1] 350 |
| 1,230 | 80 | 275 |

[1] Repressured to 500.

There were obtained 150 g. (52.5 g./g. catalyst) of a white, free-flowing, finely granular polyethylene resin. The plasticity of the resin was 1660 sq. mm. at 190° C. and 1330 sq. mm. at 250° C., measured as described in Example I.

EXAMPLE III

A. Preparation of Adduct:

| | |
|---|---|
| Anthracene (Mathieson, Coleman and Bell practical grade) | 53.4 g. (0.3 mol). |
| Sodium paste | 39.4 g. (0.6 g.-atom of Na). |
| Xylene (distilled over sodium and let stand over calcium hydride) | 450 ml. |

A 28-ounce beverage bottle containing 50 one-half-inch stainless steel balls was used in this preparation. The ingredients were charged into the bottle, which was then sealed with a crown cap lined with aluminum foil and provided with an aperture for hypodermic withdrawal of the contents. The bottle was then placed on a roller-cradle and revolved horizontally on its long axis at the rate of 60 r.p.m. for 72 hours. There resulted a black suspension of sodium-anthracene adduct which was used in the polymerization described below.

B. Polymerization:
Hexane _____ 175 ml.
Suspension of sodium-anthracene adduct (prepared as just described) _____ 9 ml. (.006 mole of adduct).
TiCl$_4$ solution (1 molar in hexane) _____ 1.5 ml. (.0015 mole TiCl$_4$).

The apparatus of Example I was made ready as described in Example I, and the above ingredients charged in the order in which they are listed. The liner was sealed into the bomb and the apparatus twice purged by pressuring to 400 p.s.i. with argon and venting. The apparatus was then pressured to 450 p.s.i. with ethylene and rocking commenced, the following being the schedule of conditions over the run.

TABLE III

| Time (min.) | Temp. (° F.) | Pressure (p.s.i.) |
| --- | --- | --- |
| 0 | 80 | 450 |
| 35 | 195 | [1] 270 |
| 60 | 140 | [2] 340 |
| 135 | 100 | [2] 340 |
| 280 | 100 | [2] 295 |
| 340 | 100 | [2] 405 |
| 1,275 | 80 | 100 |

[1] Repressured to 450.  [2] Repressured to 500.

At the end of the run, the bomb was vented and opened. The liner contained a solidly packed, grayish mass of polymer. The mass was placed in a Waring Blendor, which broke up the mass in a satisfactory manner. The mass was twice refluxed for 1 hour with a mixture of 500 ml. of ethanol and 50 ml. of concentrated hydrochloric acid, and once with a mixture of 500 ml. of ethanol and 2 ml. of concentrated ammonia. The product was dried for 15 hours in an oven at 100° C. There were obtained 95 grams (58.49 g./g. of catalyst) of a white, finely granular resinous polyethylene product. The plasticity was 2120 sq. mm. at 190° C. and 1350 sq. mm. at 250° C., determined as described in Example I. The ash was 0.14%.

EXAMPLE IV

A. Preparation of Adduct: A suspension of an adduct of sodium and anthracene was prepared exactly as described in Example III-A, and used in the polymerization of the present example as described below.

B. Polymerization:
Hexane _____ 350 ml.
Suspension of sodium-anthracene adduct (prepared as just described) _____ 15 ml. (.01 mole of adduct).
Titanium tetrachloride_____ 0.18 ml. (.00167 mole).

The apparatus of the preceding examples was employed, the bomb liner being baked, flushed, charged with the above ingredients, and inserted into the bomb chamber as described in Example I. The bomb was then flushed once by pressuring with nitrogen to 500 p.s.i. and venting, and again by pressuring with ethylene to 300 p.s.i. and venting. The bomb was then pressured to 500 p.s.i. with ethylene and rocking commenced, the schedule of conditions during the run being:

TABLE IV

| Time from start (min.) | Temp. (° F.) | Pressure (p.s.i.) |
| --- | --- | --- |
| 0 | 80 | 500 |
| 5 | 95 | 500 |
| 20 | 100 | 475 |
| 40 | 110 | 450 |
| 60 | 130 | [1] 450 |
| 63 | 150 | 500 |
| 67 | 100 | 475 |
| 75 | 170 | [1] 475 |
| 80 | 170 | 500 |
| 90 | 172 | 475 |
| 105 | 165 | [1] 440 |
| 140 | 140 | [1] 425 |
| 170 | 132 | [1] 475 |
| 220 | 120 | [1] 425 |
| 325 | 115 | [1] 400 |
| 380 | 115 | [1] 475 |
| 1,280 | 85 | 200 |

[1] Repressured to 500.

The bomb was then vented and opened, and found to be solidly packed with polymer. The mass was broken up and stirred under reflux for 1 hour with a mixture of 1200 ml. of ethanol and 60 ml. of concentrated hydrochloric acid, then cooled and filtered. The cake was again refluxed with the same mixture, filtered, and refluxed for 1 hour with a mixture of 1200 ml. of ethanol and 5 ml. of concentrated ammonia. The slurry was filtered and washed on the filter with several portions of ethanol and water, and dried in an oven at 100° C. for 18 hours. The dried polymer was a white, freely flowing powder, and amounted to 155 g. (60.5 g./g. catalyst). The resin had a plasticity of 2350 sq. mm. at 190° C. and 1450 sq. mm. at 250° C., as determined in Example I. Ash was 0.06%.

EXAMPLE V

A. Preparation of Adduct:
Xylene (distilled over sodium, $n_D^{20}=1.4962$) _____ 450 ml.
Anthracene (90–95% pure, M.P. 215°–217° C.)_____ 43.47 g. (0.300 mole).
Sodium metal (cut cubes ca. 1 cm. on each edge, bright metal) _____ 13.8 g. (0.600 g.-atom of Na).

A cylindrical stainless steel bomb provided with a bolted-on head sealed with a polytetrafluoroethylene gasket was provided for this preparation. The internal dimensions of the bomb were 20.5 cm. length by 7.4 cm. diameter. The interior contained 10 cylindrical stainless steel rods 1.75 cm. in diameter by 19.1 cm. in length. The bomb containing the rods was thoroughly dried, the above-listed ingredients charged while flushing the interior of the bomb with argon, and the head bolted on. The bomb was then rotated in a roller cradle horizontally about its axis at the rate of 60 r.p.m. and at an ambient temperature of 25° C. for a total of 22 hours. At the end of this time, the bomb was removed from the roller cradle, opened, and the contents pressured over, by means of argon, into a storage bottle which had previously been oven-dried and purged with argon. The rods and the interior of the bomb were rinsed with several successive portions of xylene, and the rinsings pressured over into the storage bottle, a total of 320 ml. of xylene being so employed. The bottle was then sealed with a crown cap provided with an aluminum foil lining and a perforation for hypodermic withdrawal of the contents. The total volume of the suspension of adduct in the bottle was 780 ml. About 0.35 g. of unreacted sodium was found on the gasket, out of reach of the action of the rods.

A sample of the product was centrifuged, and the index of refraction of the clear liquid found to be $n_D^{20}$ 1.4966. Interpolating between the index $n_D^{20}=1.4962$ of the xylene used and the index $n_D^{20}=1.4981$ of a synthetic 1.006% solution of anthracene in the same xylene, it was estimated that the xylene liquid phase in the product contained 0.211% of anthracene dissolved therein. The volume of the liquid phase was estimated to be (the volume of the product)−(the volume of anthracene used)−(the volume of sodium consumed)=780−43−14=723 ml. or 637 g. The total unreacted anthracene was therefore approximately 637×.211%=1.34 grams. The combined anthracene was therefore 53.47−1.34=52.13 g.⇌.292 mole, and the consumed sodium was 13.8−0.35=13.45 g.⇌.584 g.-atom. On this basis, the slurry contained .584÷780=0.000746 g.-atom of sodium per ml.

B. Polymerization:

| | |
|---|---|
| Hexane | 200 ml. |
| Suspension of sodium-anthracene adduct (prepared as just described | 27 ml. (0.01 mol adduct). |
| Titanium tetrachloride | 0.18 ml. (0.00167 ml). |
| Oxygen | 2 ml. |

The apparatus of Example I was employed in this experiment. The liner was flushed with argon, the hexane added, and the liner again flushed with argon. The suspension of adduct, titanium tetrachloride, and oxygen were then added. The liner was then placed in the bomb casing, a flow of argon being maintained through the casing during the insertion of the liner so as to purge the clearance spaces. The bomb was closed, and pressured to 500 p.s.i. with ethylene, and rocking commenced. Following is a schedule of conditions during the run.

TABLE V

| Time from start (min.) | Pressure (p.s.i.) |
|---|---|
| 0 | 500 |
| 75 | ¹ 175 |
| 190 | ¹ 250 |
| 295 | ¹ 300 |
| 1,235 | 75 |

¹ Repressured to 500.

At the end of the run, the bomb was vented, and the polymer removed and refluxed and stirred in a mixture of 750 ml. of ethanol and 75 ml. of concentrated hydrochloric acid for 1 hour. The slurry was filtered, and the cake again refluxed and stirred for 1 hour with the same mixture. The slurry was again filtered and then refluxed and stirred for one-half hour in a mixture of 800 ml. of ethanol and 20 ml. of concentrated ammonia. The slurry was filtered, and the cake broken up and dried to constant weight in an oven at 100° C. The dried product, a white powdery polyethylene resin, weighed 135 g. (52.7 g./g. catalyst).

EXAMPLE VI

A. Preparation of Adduct:

| | |
|---|---|
| Anthracene (Matheson, Coleman and Bell, practical grade) | 53.4 g. (0.3 mol). |
| Sodium paste (35% dispersion of sodium in petroleum) | 39.4 g. (0.6 g.-atom of sodium). |
| Xylene (distilled from sodium sand and stored over calcium hydride) | 200 ml. |

A 28-ounce beverage bottle containing 50 one-half-inch stainless steel balls was thoroughly rinsed out with water, and thereafter rinsed twice with acetone and dried in an oven for 15 minutes at 100° C. The bottle was then cooled under argon, the anthracene being added to the bottle just as the bottle was being removed from the oven. When the bottle had cooled, the sodium paste was slurried with the xylene, and poured into the bottle, which was then capped with a foil-lined crown cap provided with a hole for hypodermic withdrawal of the contents. The bottle was then encased in a fiber drum and placed on a roller-cradle which revolved the bottle horizontally about its long axis at the rate of 60 r.p.m. The bottle was removed from the apparatus, and the preparation therein used in the polymerization of the example described below.

B. Polymerization:

| | |
|---|---|
| Mixed alkane solvent (boiling point 100° F.) | 350 ml. |
| Suspension of sodium-anthracene adduct (prepared as just described) | 15 ml. (0.01 mole). |
| Titanium tetrachloride | 0.18 ml. (.0033 mole). |

The apparatus of Example I was used in this run. The liner was dried for thirty minutes in an oven at 100° C., and cooled to 25° C. while passing a current of argon therethrough. The above-listed ingredients were charged into the liner in the order in which they appear, and the liner inserted into the bomb casing, which was then flushed twice by pressuring to 500 p.s.i. with argon and venting. Rocking was commenced, and the bomb then pressured to 500 p.s.i. with ethylene. Following is a log of operations:

TABLE VI

| Time from start (min.) | Temp. (° F.) | Pressure (p.s.i.) |
|---|---|---|
| 0 | 80 | 500 |
| 40 | 120 | 475 |
| 105 | 180 | 350 |
| 120 | 160 | ¹ 300 |
| 210 | 120 | 350 |
| 420 | 105 | 375 |
| 1,280 | 80 | 225 |

¹ Repressured to 500

At the end of the run, the bomb was vented and opened. The liner was packed solid with polymer, which was removed and broken down into a slurry in a Waring Blendor. The solvent was removed by filtration, and the cake extracted by stirring with various extractants, followed each time by filtration as follows: (1) 1000 ml. of ethanol plus 50 ml. of concentrated hydrochloric acid for 2 hours, (2) 1000 ml. of ethanol plus 100 ml. of concentrated hydrochloric acid for 1 hour, and (3) 1000 ml. of ethanol and 4 ml. of concentrated ammonia for 1 hour, the cake being washed on the filter with water and ethanol between steps 2 and 3. The extracted product after step 3 was washed on the filter with ethanol and water, and then dried for 18 hours in an oven at 100° C. The product was a white polyethylene resin powder, and amounted to 140 g. (54.7 g./g. catalyst. The product had a plasticity of 2380 sq. mm. at 190° C. and 1420 sq. mm. at 250° C, determined as described in Example I, and showed 0.10% ash.

EXAMPLE VII

A. Preparation of the Adduct: The preparation of Example I-A was exactly repeated, except that 50 stainless steel balls were used, and the rotation of the bottle was carried out for 72 hours.

B. Polymerization:

| | |
|---|---|
| Hexane | 350 ml. |
| Suspension of adduct (prepared as just described) | 15 ml. (.02 g.-atom of sodium). |
| Titanium tetrachloride | 0.38 ml. (0.0033 mole). |

The liner was dried, purged, loaded with the ingredients, inserted in the bomb chamber, and purged under pressure as described in Example I. The bomb was then pressured to 400 p.s.i. with hydrogen, and then further to a total of 775 p.s.i. with ethylene. Rocking was commenced. Following is the log of conditions encountered.

TABLE VII

| Time from start (min.) | Temp. (° F.) | Pressure (p.s.i.) |
|---|---|---|
| 0 | 90 | 775 |
| 60 | 90 | [1] 725 |
| 120 | 90 | [1] 725 |
| 205 | 95 | [1] 675 |
| 255 | 95 | [1] 725 |
| 300 | 95 | [1] 750 |
| 1,215 | ------ | [1] 550 |
| 1,320 | 90 | [1] 725 |
| 1,410 | 90 | [1] 750 |
| 1,470 | 90 | [1] 750 |
| 1,530 | 90 | [1] 750 |
| 1,650 | 90 | [1] 725 |
| 1,740 | 90 | [1] 750 |
| 2,655 | 90 | [1] 640 |
| 2,715 | 90 | [1] 750 |

[1] Repressured to 775 with ethylene.

At the end of the run, the bomb was vented and opened. The liner was fairly solidly packed with polymer, the interior of the mass being slightly darker in color. The mass was broken up into a slurry in a Waring Blendor, and the solvent removed on a filter. The mass was then stirred and refluxed for two hours in a mixture of 500 ml. of water, 500 ml. of ethanol and 10 ml. of concentrated hydrochloric acid. The mass was then filtered and washed on the filter with several portions of water, then stirred and refluxed with a mixture of 500 ml. of water, 500 ml. of ethanol and 2 ml. of concentrated ammonia for 1 hour. The mass was then again filtered, and the cake washed successively with water and with ethanol. The cake was then dried at 100° C. for 18 hours, yielding a white, powdery polyethylene resin product in the amount of 155 g. (53.8 g./g. catalyst). The product had a plasticity, determined as described in Example I, of 2190 sq. mm. at 190° C., and 2920 sq. mm. at 250° C. Ash was 0.29%.

EXAMPLE VIII

| | |
|---|---|
| Hexane | 350 ml. |
| Adduct suspension (prepared as described in Example VII-A) | 30 ml. (0.04 g.-atom of sodium). |
| Titanium tetrachloride | 0.30 ml. (0.0033 mole). |

The above ingredients were loaded into the bomb liner and sealed into the bomb as described in Example I. After pressure-flushing twice with argon at 500 p.s.i., the bomb was pressured to 300 p.s.i. with hydrogen, then vented and repressured with hydrogen to 500 p.s.i. The bomb was then further pressured with ethylene up to a total pressure of 650 p.s.i., and rocking initiated. Following is the log of conditions during polymerization.

TABLE VIII

| Time from start (min.) | Temp. (° F.) | Pressure (p.s.i.) |
|---|---|---|
| 0 | 85 | 650 |
| 55 | 85 | [1] 600 |
| 135 | 85 | [2] 600 |
| 195 | 90 | [1] 575 |
| 255 | 95 | [1] 575 |
| 325 | 100 | [1] 550 |
| 375 | 110 | [1] 575 |
| 1,290 | ------ | [2] 300 |
| 1,340 | ------ | [3] 525 |
| 1,360 | ------ | [4] 550 |
| 1,405 | 100 | [4] 575 |
| 1,440 | 100 | [4] 575 |
| 1,465 | ------ | ([5]) |
| 1,515 | 100 | [5] 550 |
| 1,605 | ------ | [5] 550 |
| 1,635 | ------ | [5] 550 |
| 1,710 | 100 | [5] 550 |
| 1,755 | 100 | [5] 550 |
| 1,815 | 100 | [5] 550 |
| 2,730 | 85 | 300 |

[1] Repressured to 650 p.s.i. with ethylene.
[2] Released pressure and repressured to 300 p.s.i. with hydrogen and further to 650 p.s.i. with ethylene.
[3] Repressured to 640 p.s.i. with ethylene.
[4] Repressured to 625 p.s.i. with ethylene.
[5] Repressured to 600 p.s.i. with ethylene.

At the end of the run, the bomb was opened and the liner found solidly packed with polymer which was colored gray in the interior, indicating that excess catalyst had been used. The cake was broken up in a Waring Blendor with ethanol, and the slurry filtered. The cake was stirred and refluxed with a mixture of 500 ml. of water, 500 ml. of ethanol and 100 ml. of concentrated hydrochloric acid. The slurry was then filtered and washed on the filter with water and ethanol. The cake was then stirred and refluxed for 1.5 hours with 500 ml. of water, 500 ml. of ethanol and 5 ml. of concentrated ammonia. The slurry was then filtered and thoroughly washed on the filter successively with water and ethanol. The product was then dried in an oven at 100° C. for 26 hours, and amounted to 165 g. (32.3 g./g. catalyst).

EXAMPLE IX

| | |
|---|---|
| Hexane | 350 ml. |
| Suspension of sodium-anthracene adduct (prepared as described in Example VII-A) | 15 ml. (.01 g.-atom of sodium). |
| Titanium tetrachloride | 0.38 ml. (0.0033 mole). |

The apparatus of Example I was prepared and charged with the above ingredients and sealed into the bomb chamber in the manner described in that example. The loaded bomb was then flushed twice by pressuring to 500 p.s.i. with nitrogen and once by pressuring with hydrogen to 200 p.s.i. The bomb was then pressured with hydrogen to 500 p.s.i. and rocked at room temperature for 45 minutes. The hydrogen was then vented and the bomb pressured with ethylene to 500 p.s.i., and rocking continued. Following is a log of conditions during the run.

TABLE IX

| Time since start (min.) | Temp. (° F.) | Pressure (p.s.i.) |
|---|---|---|
| 0 | 85 | 500 |
| 50 | 160 | |
| 225 | 105 | [1] 225 |
| 295 | 105 | [1] 425 |
| 1,215 | | 225 |

[1] Repressured to 500.

At the end of the run, the reactor was opened. The liner contained an almost white, compacted polymer which broke up readily in the Waring Blendor with addition of a small amount of ethanol. The slurry was filtered and the cake stirred and refluxed with a mixture of 500 ml. of water, 500 ml. of ethanol and 100 ml. of concentrated hydrochloric acid for 1 hour. The slurry was again filtered, and the cake stirred, refluxed for one hour with a mixture of 500 ml. of ethanol, 500 ml. of water and 5 ml. of concentrated ammonia. The slurry was then filtered and washed on the filter with water and ethanol, and the cake dried in an oven at 100° C. for 18 hours. The product was a freely-flowing white powder and amounted to 110 g. (37.2 g./g. catalyst).

EXAMPLE X

A. Preparation of Adduct:

Anthracene (Mathieson, Coleman and Bell, practical grade)_____ 17.8 g. (0.1 mole).
Sodium paste (35% dispersion in petrolatum)_____ 13.2 g. (0.2 g.-atom).
p-Cymene (Eastman White label, refluxed 3 hours with sodium and distilled at 175–177° C.)_____ 150 ml.

A 28-ounce beverage bottle containing 50 one-half inch stainless steel balls was used in the preparation. The bottle and balls were heated one hour in an oven at 100° C., then cooled to 25° C. while passing a current of argon thereinto. The above ingredients were then charged into the bottle, which was then sealed with a crown cap provided with an aluminum foil liner and an aperture for hypodermic removal of the contents. The bottle was then placed upon a roller cradle which revolved it horizontally about its long axis at the rate of 60 r.p.m. for 114 hours. The suspension developed a blue coloration in the early stages of the grinding, but this changed to black during the later stages. The preparation was used in the polymerization described below.

B. Polymerization:

Hexane _____ 200 ml.
Suspension of sodium-anthracene adduct (prepared as just described)__ 7.5 ml. (0.005 mole of adduct).
Titanium tetrachloride_____ 0.18 ml. (0.00167 mole).

The apparatus of Example I was prepared, loaded with the above ingredients, and sealed into the bomb chamber as described in Example I. The bomb was flushed twice by pressuring with nitrogen to 500 p.s.i. and venting and twice by pressuring with ethylene to 500 p.s.i. and venting. The bomb was then pressured to 500 p.s.i. with ethylene, and rocking commenced. Following is the log of operations.

TABLE X

| Time from start (min.) | Pressure (p.s.i.) |
|---|---|
| 0 | 500 |
| 20 | [1] 450 |
| 195 | [1] 350 |
| 1,330 | 60 |

[1] Repressured with ethylene to 500.

At the end of the run, the bomb was vented and the polymer therein broken up with ethanol in a Waring Blendor. The slurry was then stirred, refluxed for two one-hour periods with a mixture of 700 ml. of ethanol and 30 ml. of concentrated hydrochloric acid, and then for one-hour period with a mixture of 700 ml. of ethanol and 5 ml. of concentrated ammonia, each period being followed by a filtration to remove the extractant. The final cake was dried in an oven at 100° C. for 18 hours, yielding 91.8 grams of a white, powdery polyethylene having a plasticity of 1250 sq. mm. at 250° C. determined as described in Example I. Ash content was 0.13%.

EXAMPLE XI

Hexane_____ 1 liter.
Suspension of sodium-anthracene adduct (prepared as described in Example VII–A)_____ 37.5 ml. (0.025 mole of adduct).
Titanium tetrachloride_____ 0.912 ml. (0.0083 mole).

A three-quarter gallon autoclave provided with a rotary agitator was used in this run. The autoclave was flushed with argon for 45 minutes with the head removed; after which the above ingredients were charged, the head replaced, and flushing with argon continued, the argon escaping through a vent. The vent was then closed, and the autoclave purged twice by pressuring with ethylene to 200 p.s.i. and venting. The autoclave was then pressured to 100 p.s.i. with hydrogen and further to 200 p.s.i. by addition of ethylene. Stirring was then initiated, cooling being applied to the exterior of the autoclave as needed to keep the reaction within bounds, and the autoclave being repressured with ethylene from time to time as indicated. Following is a log of the operations.

TABLE XI

| Time from start (min.) | Temp. (° F.) | Pressure (p.s.i.) | Repressured to (p.s.i.) |
|---|---|---|---|
| 0 | 80 | 200 | |
| 5 | 80 | 130 | 300 |
| 10 | 85 | 200 | 400 |
| 30 | 95 | 200 | 400 |
| 40 | 100 | | |
| 115 | 110 | 160 | 400 |
| 160 | 90 | 300 | 500 |
| 200 | 95 | 360 | 600 |
| 220 | 100 | 500 | 600 |
| 280 | 120 | 480 | 600 |
| 315 | 130 | 480 | 600 |
| 1,255 | 90 | 140 | 600 |
| 1,285 | 90 | 400 | 600 |
| 1,330 | 90 | 400 | 600 |
| 1,420 | 110 | 240 | 570 |
| 1,570 | 170 | 100 | 550 |
| 1,600 | 100 | 300 | 550 |
| [1] 1,660 | 120 | 370 | 550 |
| 1,675 | 130 | 520 | |
| 1,960 | 140 | 300 | 500 |

[1] Stirring stopped at this point.

At the end of the run, the autoclave was vented, and the polymer removed and cut up in a Waring Blendor with a small amount of ethanol. The slurry was then filtered, washed on the filter with ethanol, and the cake dried in an oven at 100° C. The product was a freely-flowing powdered polyethylene, and weighed 400.62 g. (62.8 g./g. catalyst). Plasticity, determined as described in Example I above, was 1520 sq. mm. at 190° C. and 1730 sq. mm. at 250° C.

EXAMPLE XII

| | |
|---|---|
| Hexane | 200 ml. |
| Suspension of sodium-anthracene adduct (prepared as described in Example V-A) | 27 ml. (0.01 mole of adduct). |
| Titanium tetrachloride | 0.18 ml. (0.00167 mole). |

The apparatus of Example I was used in this experiment. The above-listed ingredients were charged with simultaneous flushing of the liner with a slow current of argon, and after the ingredients were charged, the charging opening of the liner was closed with cellulose tape. The liner was then inserted into the bomb casing, the latter being continuously flushed with argon during the insertion, and the bomb closed. Rocking was commenced, and the bomb pressured to 500 p.s.i. with ethylene. Following is a log of the reaction.

TABLE XII

| Time from start (min.) | Pressure (p.s.i.) | Repressured with ethylene to a total pressure of (p.s.i.) |
|---|---|---|
| 0 | 500 | |
| 85 | 175 | 500 |
| 190 | 250 | 500 |
| 505 | 300 | 500 |
| 1,235 | 75 | |

At the close of the run, the autoclave was vented, and the charge removed and refluxed with stirring in a mixture of 750 ml. of ethanol and 75 ml. of concentrated hydrochloric acid for one hour. The slurry was filtered, and the cake refluxed with stirring in a mixture of 800 ml. of ethanol and 80 ml. of concentrated hydrochloric acid for one hour. The slurry was filtered and the cake stirred and refluxed with a mixture of 800 ml. of ethanol and 20 ml. of concentrated ammonia for one-half hour, and then filtered. The cake was broken up and dried in an oven at 100° C. for 24 hours. The dried product, a white, powdery polyethylene, weighed 135 g.

EXAMPLE XIII

| | |
|---|---|
| Anthracene (M.P. 213–214° C.) | 35.6 g. (0.2 mole). |
| Sodium sand (prepared by melting and shaking under xylene, followed by cooling and replacement of xylene by decantation with heptane; beads ca. 1–2 mm. in diameter) | 9.2 g. (0.40 g.-atom). |
| Heptane (washed with sulfuric acid and distilled from sodium sand) | 300 ml. |
| Diethyl ether (dried over sodium wire) | 150 ml. |

A 28-ounce beverage bottle containing 50 one-half-inch stainless steel balls was used in this preparation. The bottle was dried in an oven at 100° C. for one hour. The bottle was removed from the oven, the anthracene introduced, and the bottle cooled while passing a current of argon through the bottle. The sodium sand was then rinsed into the bottle with successive portions of the heptane, and the ether added, all with continued flushing with argon. The bottle was then sealed, wrapped in rags, and inserted into a 4-inch pipe, which was capped and placed on a roller cradle and revolved horizontally on its axis at the rate of 60 r.p.m. for 41 hours.

The bottle was then removed from the apparatus, and the contents, plus a following rinse of 100 ml. of heptane, was pressured with argon over into a vacuum distillation apparatus (continuously flushed with argon) in which the reaction mass was distilled with periodic addition of heptane to chase out the ether in the reaction run. A total of 500 ml. of heptane was added during distillation and 445 ml. of liquid were recovered from the distillation receiver. The residue in the distillation flask was pressured over into a storage bottle, the clingage being rinsed over with a further 100 ml. of heptane. The storage bottle was sealed with a crown cap having a perforation for hypodermic withdrawal of the contents. The total volume of slurry in the bottle was 750 ml. Titration of a sample with acid indicated that the slurry contained 0.0005 gram-atoms of sodium per ml.

| | |
|---|---|
| Heptane | 200 ml. |
| Sodium-anthracene adduct suspension | 20 ml. (0.005 mole). |
| Titanium tetrachloride solution (in heptane: 6.3 ml.≃.005 mole $TiCl_4$) | 2.1 ml. (0.00167 mole $TiCl_4$). |

The apparatus of Example I was used in this run. The liner was dried in an oven at 100° C. for one-half hour, and cooled to 28° C. while flushing with argon. The heptane was added, the bomb again flushed with argon, and the adduct and titanium tetrachloride added. The liner was then inserted in the bomb (no flushing) which was then closed and flushed twice with ethylene by pressuring to 200 p.s.i. and venting. The bomb was then pressured to 500 p.s.i. with ethylene, and rocking commenced and continued for the entire run. Ambient temperature was 25° C. for the run, and following is a log of the operation.

TABLE XIII

| Time after start (min.) | Pressure (p.s.i.) |
|---|---|
| 0 | 500 |
| 60 | 400 |
| 125 | 335 |
| 140 | 305 |
| 160 | 275 |
| 180 | [1] 140 |
| 490 | 390 |
| 360 | 400 |
| 1,290 | |

[1] Repressured with ethylene to 500.

At the end of the run, the pressure was vented, and the product dug out. The solvent had been completely absorbed in a gel with the polymer, and the product was easily crumbled. The product was whipped for 5 minutes on a Waring Blendor with 500 ml. of ethanol, yielding a slurry which was heated to boiling and filtered. At this point the filtrate was yellow and the cake a light orange-pink. A subsequent wash in a hot mixture of 500 ml. of ethanol and 150 ml. of concentrated hydrochloric acid gave an orange filtrate. Two further washes, each with 500 ml. hot ethanol, were given, and the product dried in an oven at 100° C. for 24 hours. The product, a fine, white, powdery polyethylene, amounted to 91.1 grams (63.7 g./g. catalyst). The ash content was 0.12% and the plasticity, determined as described in Example I, was 1350 sq. mm. at 250° C. Infra-red analysis revealed no unsaturation or methyl groups. Density was $d_{23}^{23}$ 0.938, tensile strength 1925 p.s.i.

EXAMPLE XIV

The procedure of Example XIII was repeated, except that 200 ml. of mixed xylenes distilled over sodium were used in place of the heptane. Following is a log of the run.

TABLE XIV

| Time after start (min.) | Pressure (p.s.i.) |
|---|---|
| 0 | 500 |
| 20 | 475 |
| 110 | 375 |
| 210 | [1] 325 |
| 270 | 375 |
| 480 | [2] 325 |
| 1,290 | 375 |

[1] Repressured to 500 with ethylene.
[2] Repressured to 675 with ethylene.

At the end of the run, the pressure was released and the product broken up in a Waring Blendor and washed with a hot mixture of 500 ml. of ethanol and 50 ml. of concentrated hydrochloric acid. The product was then filtered and washed a second time in a hot mixture of 500 ml. of ethanol and 50 ml. of concentrated hydrochloric acid, re-filtered, given a final wash with 500 ml. of alcohol, filtered and dried in an oven at 103° C. for 24 hours. The product was a white, powdery polyethylene resin amounting to 63.3 g. The product had a plasticity, determined as described in Example I, of 1320 sq. mm. at 250° C.

What is claimed is:

1. Process which comprises polymerizing ethylene by contacting the same, at a partial pressure from atmospheric up to 700 p.s.i. and at a temperature from 9° F. to 220° F., with a catalyst comprising the reaction product of (1) disodium adduct of anthracene and (2) titanium tetrachloride, the ratio of gram-atoms of sodium in the disodium adduct of anthracene (1) to the gram-mols of titanium tetrachloride (2) being from 3 to 12, and the disodium adduct of anthracene (1) having been subjected to exhaustive grinding.

2. Process which comprises polymerizing ethylene by contacting ethylene, at a partial pressure of from 300 to 700 p.s.i. and at a temperature from 9° F. to 220° F., with a catalyst comprising the reaction product of (1) disodium adduct of anthracene and (2) titanium tetrachloride, the ratio of gram-atoms of sodium in the disodium adduct of anthracene (1) to the gram-mols of titanium tetrachloride (2) being from 3 to 12 and the disodium adduct of anthracene (1) having been subjected to exhaustive grinding.

3. A catalytic composition comprising the reaction product of (1) disodium adduct of anthracene and (2) titanium tetrachloride, the ratio of gram-atoms of sodium in the disodium adduct of anthracene (1) to the gram-mols of titanium tetrachloride (2) being from 3 to 12, and the disodium adduct of anthracene (1) having been subjected to exhaustive grinding.

References Cited in the file of this patent

UNITED STATES PATENTS

| 2,721,189 | Anderson | Oct. 18, 1955 |
| 2,867,612 | Pieper et al. | Jan. 6, 1959 |

FOREIGN PATENTS

| 550,814 | Italy | Nov. 10, 1956 |
| 1,137,459 | France | Jan. 14, 1957 |